(12) United States Patent
Wang et al.

(10) Patent No.: US 9,361,039 B2
(45) Date of Patent: Jun. 7, 2016

(54) METHOD, RELATED APPARATUS, AND SYSTEM FOR VIRTUAL NETWORK MIGRATION

(71) Applicant: Huawei Technologies Co., Ltd., Shenzhen (CN)

(72) Inventors: Jiao Wang, Beijing (CN); Songhai Ye, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 254 days.

(21) Appl. No.: 14/064,346

(22) Filed: Oct. 28, 2013

(65) Prior Publication Data
US 2014/0052949 A1 Feb. 20, 2014

Related U.S. Application Data

(63) Continuation of application No. PCT/CN2011/073447, filed on Apr. 28, 2011.

(51) Int. Cl.
*G06F 15/16* (2006.01)
*G06F 3/06* (2006.01)
(Continued)

(52) U.S. Cl.
CPC ............ *G06F 3/0647* (2013.01); *G06F 3/067* (2013.01); *G06F 3/0619* (2013.01); *H04L 43/0817* (2013.01); *H04L 41/0896* (2013.01); *H04L 43/16* (2013.01)

(58) Field of Classification Search
CPC ....... H04L 61/103; H04L 41/50; H04L 12/24; H04L 43/16; H04L 41/0896; H04L 43/0817; G06F 3/0647; G06F 3/067; G06F 15/16
USPC .................................. 709/226, 238; 370/398
See application file for complete search history.

(56) References Cited

U.S. PATENT DOCUMENTS 7,127,445 B2 * 10/2006 Mogi .................... G06F 3/0605
7,577,720 B2 * 8/2009 Vertes ................... G06F 11/203
370/229

(Continued)

FOREIGN PATENT DOCUMENTS

CN  1554055 A  12/2004
CN  101206621 A  6/2008

(Continued)

OTHER PUBLICATIONS

Foreign Communication From a Counterpart Application, Chinese Application No. 201180000593.6, Chinese Office Action dated Nov. 2, 2012, 8 pages.

(Continued)

*Primary Examiner* — Tesfay Yohannes
(74) *Attorney, Agent, or Firm* — Conley Rose P.C.; Grant Rodolph; Nicholas K. Beaulieu

(57) ABSTRACT

A method, related apparatus, and system for virtual network migration are provided. A method provided by an embodiment of the present disclosure includes: locating a source physical node in a regional physical network; obtaining information of a virtual element corresponding to each virtual network on the source physical node and state information of each physical node in the regional physical network; determining, according to information of the virtual elements and the state information, a physical node that can execute virtual network migration in the regional physical network; reconstructing a mapping relationship between each virtual network and the regional physical network on the physical node; comparing the mapping relationships of each virtual network; selecting a mapping relationship with minimum migration consumption as a mapping relationship for executing migration; and sending, according to the mapping relationship for executing migration, a migration instruction to a physical node to execute virtual network migration.

24 Claims, 7 Drawing Sheets

(51) Int. Cl.
*H04L 12/26* (2006.01)
*H04L 12/24* (2006.01)

(56) References Cited

U.S. PATENT DOCUMENTS

| | | | | |
|---|---|---|---|---|
| 8,194,680 | B1* | 6/2012 | Brandwine | H04L 61/103 370/398 |
| 8,493,883 | B2* | 7/2013 | Singh | H04L 41/0866 370/254 |
| 8,935,314 | B2* | 1/2015 | Ravichandran | G06Q 10/06 709/202 |
| 2003/0018927 | A1 | 1/2003 | Gadir et al. | |
| 2005/0193245 | A1* | 9/2005 | Hayden | G06F 11/2069 714/13 |
| 2008/0147887 | A1 | 6/2008 | Freimuth et al. | |
| 2009/0254701 | A1* | 10/2009 | Kurokawa | G06F 3/0604 711/112 |
| 2010/0082543 | A1* | 4/2010 | Nagarajan | G06F 3/0605 707/640 |
| 2011/0022711 | A1* | 1/2011 | Cohn | G06F 9/5061 709/225 |
| 2011/0179176 | A1* | 7/2011 | Ravichandran | G06Q 10/06 709/226 |
| 2011/0246647 | A1* | 10/2011 | Marquezan | H04L 12/2602 709/224 |
| 2012/0304175 | A1* | 11/2012 | Damola | G06F 11/3419 718/1 |

FOREIGN PATENT DOCUMENTS

| | | |
|---|---|---|
| CN | 101504620 A | 8/2009 |
| JP | 2009267625 A | 11/2009 |
| JP | 2011028408 A | 2/2011 |
| WO | 2010066430 A1 | 6/2010 |

OTHER PUBLICATIONS

Foreign Communication From a Counterpart Application, European Application No. 11758825.1 Extended European Search Report dated Mar. 31, 2014, 7 pages.

Foreign Communication From a Counterpart Application, PCT Application No. PCT/CN2011/073447, English Translation of Chinese Search Report dated Feb. 2, 2012, 3 pages.

Foreign Communication From a Counterpart Application, PCT Application No. PCT/CN2011/073447, Englsih Translation of Chinese Written Opinion dated Feb. 2, 2012, 5 pages.

Pisa, P. S., et al., "OpenFlow and Xen-Based Virtual Network Migration," 2010, 12 pages.

Wang, Y., et al., "VROOM: Virtual ROuters on the Move," ACM SIGCOMM Computer Communication Review, vol. 38, No. 4, XP551096686, Oct. 1, 2008, 8 pages.

Wood, T., et al., "Black-box and Gray-box Strategies for Virtual Machine Migration," 4th USENIX Symposium on Networked Systems Design & Implementation, 2007, 14 pages.

Yu, M., et al., "Rethinking Virtual Network Embedding: Substrate Support for Path Splitting and Migration," ACM SIGCOMM, Computer Communication, Review 4, 2008, 9 pages.

Partial English Translation and Abstract of Japanese Patent Application No. JP2009-267625A, Mar. 7, 2015, 18 pages.

Partial English Translation and Abstract of Japanese Patent Application No. JP2011-028408A, Mar. 7, 2015, 38 pages.

Foreign Communication From a Counterpart Application, Japanese Application No. 2014-506713, Japanese Office Action dated Jan. 6, 2015, 3 pages.

Foreign Communication From a Counterpart Application, Japanese Application No. 2014-506713, English Translation of Japanese Office Action dated Jan. 6, 2015, 2 pages.

* cited by examiner

METHOD, RELATED APPARATUS, AND SYSTEM FOR VIRTUAL NETWORK MIGRATION

CROSS-REFERENCE TO RELATED APPLICATION

This application is a continuation of International Application No. PCT/CN2011/073447, filed on Apr. 28, 2011, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present disclosure relates to the communications field, and in particular, to a method, related apparatus, and system for virtual network migration.

BACKGROUND

Network virtualization, as an important technology in a future network architecture, is expected to integrate different physical resources on the basis of an existing physical infrastructure to provide an efficient and independent network service environment according to requirements. As a network environment, the network virtualization technology allows a service provider to dynamically construct multiple heterogeneous virtual networks on a same physical infrastructure, where the virtual networks coexist and are independent of each other. In addition, the network virtualization technology allows owners of the virtual networks to dynamically deploy and manage customized end-to-end services for users in their virtual networks in real time.

Virtual network migration is an important technology for network virtualization. By using the virtual network migration technology, a mapping relationship of a virtual network on a physical network may be dynamically adjusted according to a cause that triggers migration, and an operator is allowed to dynamically plan physical resources and traffic management according to requirements, and improve resource utilization of the physical infrastructure. Meanwhile, according to the change of state information of the physical network and service requirements of the virtual network, a single node or a part of nodes of the virtual network may be dynamically re-deployed to meet the traffic or service requirements and reduce unnecessary physical loss and energy consumption.

The cause that triggers virtual network migration may be analyzed from internal and external aspects.

The external causes include failure to satisfy a new virtual network request, change of a service requirement, and so on.

When a new virtual network request arrives, because utilization of a part of physical infrastructures in the existing physical network is high, which cannot satisfy the mapping requirement of the virtual network, the mapping of the existing virtual network may be replanned, so that utilization of network resources is more reasonable and that idle physical network resources satisfy the new virtual network request.

When the service requirement is changed, the physical infrastructure of the source virtual network may fail to satisfy the new requirement and may cause virtual network migration to search for more suitable mappings on the physical topology.

The internal causes include: migration of a virtual node in the virtual network, which is caused by sudden system breakdown, migration of a virtual link in the virtual network, which is caused by link damage, virtual network migration caused by device upgrade, virtual network migration caused by a load balance problem, and so on.

In the prior art, when a physical node needs to perform virtual network migration, first a virtual node of the physical node is obtained, and then in the original physical network architecture, a suitable new physical node is found in the vicinity of the physical node, and a virtual link is established between the source physical node and the new physical node for virtual network migration.

In the existing technical solution, search of a new physical node is limited to search of a new physical node in only the vicinity of the physical node in the original physical network architecture. However, if usage of the original physical network resources is high, it is hard to find a suitable new physical node for virtual network migration. Therefore, the possibility of migration failure is high. Furthermore, search of a new physical node in this solution is based on a shortest path principle (that is, searching for a new physical node in the vicinity of the physical node), but the search method does not consider usage of resources of the new physical node; after virtual network migration, it is quite possible that usage of resources of the new physical node is too high but usage of resources of other physical nodes in the physical network is very low, resulting in unreasonable resource allocation and low network operation efficiency.

SUMMARY

Embodiments of the present disclosure provide a method, related apparatus, and system for virtual network migration, which are used for migrating a virtual network properly and effectively.

A method for virtual network migration according to the present disclosure includes: locating a source physical node in a regional physical network, where the source physical node is a physical node that triggers virtual network migration; obtaining information of a virtual element corresponding to each virtual network on the source physical node and state information of each physical node in the regional physical network; determining, according to information of the virtual elements and the state information, a physical node that can execute virtual network migration in the regional physical network; reconstructing a mapping relationship between each virtual network and the regional physical network on the physical node that can execute virtual network migration; comparing the mapping relationships of each virtual network; and selecting a mapping relationship with minimum migration consumption as a mapping relationship for executing migration; and sending, according to the mapping relationship for executing migration, a migration instruction to a physical node that needs to execute virtual network migration.

An apparatus for virtual network migration according to the present disclosure includes: a locating unit configured to locate a source physical node in a regional physical network; a first obtaining unit configured to obtain information of a virtual element corresponding to each virtual network on the source physical node and state information of each physical node in the regional physical network; a reconstructing unit configured to determine, according to information of the virtual elements and the state information, a physical node that can execute virtual network migration in the regional physical network, reconstruct a mapping relationship between each virtual network and the regional physical network on the physical node that can execute virtual network migration, compare the mapping relationships of each virtual network, and select a mapping relationship with minimum migration consumption as a mapping relationship for executing migration; and a first sending unit configured to send, according to the mapping relationship for executing migration, a migration instruction to a physical node that needs to execute virtual network migration.

A system for virtual network migration according to the present disclosure includes: a regional management entity and a central management entity. The central management entity is configured to provide information of a virtual element corresponding to a source physical node for the regional management entity. The regional management entity is configured to: locate a source physical node in a regional physical network, where the source physical node is a physical node that triggers virtual network migration; obtain information of a virtual element corresponding to each virtual network on the source physical node and state information of each physical node in the regional physical network; determine, according to information of the virtual elements and the state information, a physical node that can execute virtual network migration in the regional physical network; reconstruct a mapping relationship between each virtual network and the regional physical network on the physical node that can execute virtual network migration; compare the mapping relationships of each virtual network; select a mapping relationship with minimum migration consumption as a mapping relationship for executing migration; and send, according to the mapping relationship for executing migration, a migration instruction to a physical node that needs to execute virtual network migration.

As seen from the above technical solutions, embodiments of the present disclosure have the following advantages: According to the present disclosure, after a source physical node in a regional physical network is located, information of a virtual element corresponding to each virtual network on the source physical node and state information of the regional physical network are obtained; then mapping relationships between the regional physical network and virtual networks are reconstructed according to the state information and information of the virtual elements, and a mapping relationship with minimum migration consumption is selected from the mapping relationships of the virtual networks as a mapping relationship for executing migration; and then in the mapping relationship for executing migration, a physical node whose matching relationship with the virtual element is changed is searched out to perform migration. Reconstruction of the mapping relationship for executing migration considers the state information of each physical node in the regional physical network, provides more choices of physical nodes for virtual network migration, and improves the success ratio of virtual network migration. In addition, the matching between the virtual element and the physical node is more reasonable, which also improves utilization of the physical network.

DETAILED DESCRIPTION

Embodiments of the present disclosure provide a method, related apparatus, and system for virtual network migration, which are used for migrating a virtual network properly and effectively.

Figure 1:
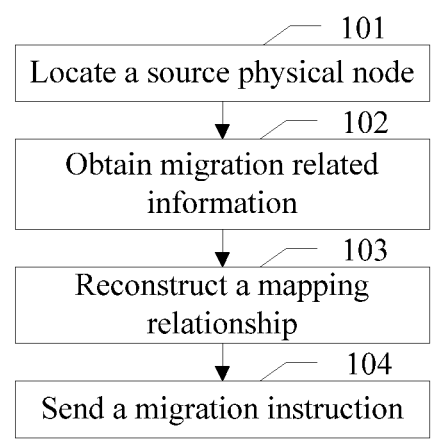
FIG. 1 is a schematic flowchart of a method for virtual network migration according to an embodiment of the present disclosure.

As shown in FIG. 1, a method for virtual network migration according to an embodiment of the present disclosure includes the following:

101. Locate a Source Physical Node in a Regional Physical Network.

A regional management entity locates the source physical node in the regional physical network.

The regional physical network is a network composed of several physical nodes managed by the regional management entity. The source physical node is a physical node that triggers virtual network migration. When it is necessary to perform virtual network migration, the regional management entity may locate, according to different trigger causes, a physical node that needs to execute virtual network migration, where the trigger causes may include: failure of network resources on a physical node to satisfy a virtual network request, change of a service requirement, malfunction of a physical node in the physical network, device upgrade of the physical node, and so on.

102. Obtain Migration Related Information.

The regional management entity obtains information of a virtual element corresponding to each virtual network on the source physical node and state information of each physical node in the regional physical network.

The virtual element includes a virtual node and a virtual link bearing the virtual node. When obtaining the virtual element, the regional management entity may also know the virtual network bearing the virtual element. Multiple virtual elements may be mapped to a physical node, where each virtual element on the physical node corresponds to each virtual network on a one-to-one basis.

The state information of the physical node is information of network performance required by a service application, where the state information may specifically include: storage capacity of the physical node, available bandwidth resources of the physical node, calculation resources of the physical node, the forwarding speed and link transmission capabilities of the physical node, and so on; the above state information may be obtained selectively according to service requirements corresponding to the regional physical network, where the specific quantity and content included in the state information are not limited.

The regional management entity may separately manage all information of the regional physical network, or hand over a part of the information (such as a virtual element corresponding to a physical node) of the regional physical network to other devices for management, and obtain the information by information interaction when requiring to use the information. The specific implementation manner of information management may be decided according to the actual condition, and is not limited herein.

103. Reconstruct a Mapping Relationship.

The regional management entity determines, according to information of the virtual element corresponding to each virtual network and the state information of each physical node in the regional physical network, a physical node that can execute virtual network migration in the regional physical network; reconstructs a mapping relationship between each virtual network and the regional physical network on the physical node that can execute virtual network migration; compares the mapping relationships of each virtual network; and selects a mapping relationship with minimum migration consumption as a mapping relationship for executing migration.

Different network services have different requirements on the network. For example, a storage related service may have a certain requirement on the storage capacity of a physical node, and also have a certain requirement on the transmission bandwidth between devices such as a physical node, switch, and router in the regional physical network. In this case, the state information may be storage capacity of the physical node and the available bandwidth resources of the regional physical network, or during the operation of reconstructing a mapping relationship, weights for the storage capacity of the physical node and the available bandwidth resources of the regional physical network are increased. Similarly, for a speed calculation related service, there is a requirement on the processing capability of the physical node; in this case, the state information is mainly related information of calculation resources of the physical node, while the requirement on the storage capability of a disk may be weakened (which may be not used as the state information for remapping calculation, or a small weight may be set in remapping calculation).

There is a mapping relationship between a regional physical network and a virtual network, where the common form of the mapping relationship is: physical node-virtual node, and physical link-virtual link. Therefore, each physical node corresponds to a virtual node in the virtual network and a virtual link bearing the virtual node. When virtual network migration is triggered, the original mapping relationship between the regional physical network and the virtual network is changed. However, the method for changing the mapping relationship in the present disclosure is to reconstruct all mapping relationships according to the state information of the regional physical network. Compared with the prior art in which the virtual node on the physical node having insufficient resources is directly migrated to a nearby physical node, the migration solution of the present disclosure is more reasonable in resource allocation.

Because the source physical node may include virtual elements corresponding to multiple virtual networks, reconstruction of multiple relationships of virtual networks may occur. After obtaining a mapping relationship corresponding to each virtual network, the regional management entity selects a mapping relationship with minimum migration consumption for virtual network migration, so that the overhead caused by virtual network migration is decreased.

104. Send a Migration Instruction.

The regional management entity sends, according to the mapping relationship for executing migration, a migration instruction to the physical node that needs to execute virtual network migration.

After obtaining the mapping relationship for executing migration, the regional management entity searches for a physical node whose matching relationship with the virtual element is changed in the mapping relationship, sends a migration instruction to the source physical node and a new physical node corresponding to the virtual element so that a link connection between the source physical node and the new physical node is established, and migrates the data information related to the virtual element on the source physical node to the new physical node.

According to the present disclosure, after a source physical node in a regional physical network is located, information of a virtual element corresponding to each virtual network on the source physical node and state information of the regional physical network are obtained; then mapping relationships between the regional physical network and virtual networks are reconstructed according to the state information and information of the virtual elements, and a mapping relationship with minimum migration consumption is selected from the mapping relationships of the virtual networks as a mapping relationship for executing migration; and then in the mapping relationship for executing migration, a physical node whose matching relationship with the virtual element is changed is searched out to perform migration. Reconstruction of the mapping relationship for executing migration considers the state information of each physical node in the regional physical network, provides more choices of physical nodes for virtual network migration, and improves the success ratio of virtual network migration. In addition, the matching between the virtual element and the physical node is more reasonable, which also improves utilization of the physical network.

To facilitate reasonable utilization of network resources, and uniform allocation and adjustment of network resources, the present disclosure classifies management terminals into central management entities and regional management entities. A central management entity is responsible for receiving and storing a virtual network request, and storing the state of the mapping between a regional physical network and a virtual network. The central management entity may manage multiple regional physical networks in a centralized manner. A regional management entity is responsible for managing network resources of each physical node in the domain of the regional management entity through information interaction with the physical node in the domain of the regional management entity. The following embodiments use the regional physical network managed by the central management entity as an example to describe a method for virtual network migration according to the present disclosure.

Figure 2:
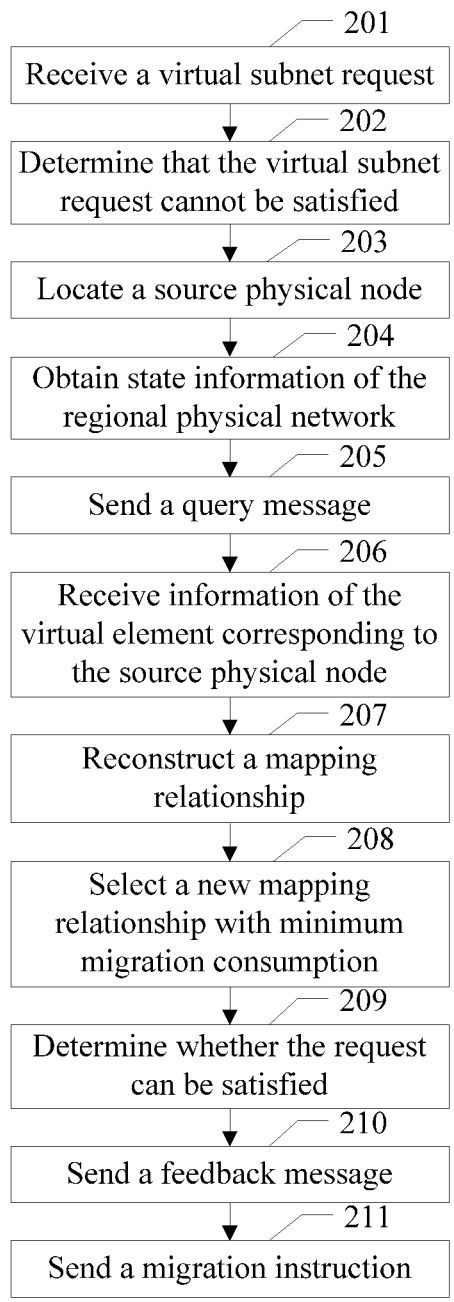
FIG. 2 is another schematic flowchart of a method for virtual network migration according to an embodiment of the present disclosure.

When the physical node managed by the regional management entity cannot satisfy a virtual network request, the central management entity and regional management entity of the present disclosure provide a corresponding virtual network migration mechanism. Specifically, as shown in FIG. 2, the method for virtual network migration in the embodiment of the present disclosure includes the following:

201. Receive a Virtual Subnet Request.

A regional management entity receives a virtual subnet request sent by a central management entity.

After receiving a virtual network request sent by a user, the central management entity splits the virtual network request into several virtual subnet requests, and sends the virtual subnet requests to corresponding regional management entities for allocating resources of virtual subnets.

202. Determine that the Virtual Subnet Request Cannot be Satisfied.

The regional management entity determines, according to state information of the regional physical network, whether a current regional physical network can satisfy a mapping requirement of the virtual subnet request, and if not, triggers step 203.

After receiving the virtual subnet request, the regional management entity first obtains the current state information of the regional physical network, and constructs a physical topology according to the state information and the virtual subnet request, and then uses a mapping algorithm locally preset by the regional management entity to execute the mapping matching between a virtual subnet and the regional physical network; in the matching process, if it is found that the state information of the regional physical network cannot satisfy the mapping requirement of the virtual subnet request, it indicates that resources of some physical nodes in the regional physical network in the region are insufficient, and the virtual networks that the physical nodes bear need to be migrated. Therefore, the step of locating a physical node that requires migration is triggered.

203. Locate a Source Physical Node.

The regional management entity locates the source physical node in the regional physical network according to the virtual subnet request.

The method for locating the source physical node in the regional physical network may be as follows: The regional management entity first selects a failed element of a longest matching sequence in the virtual subnet request, where the failed element is a virtual element that fails to be matched in the process of matching the virtual subnet; then searches for a successfully matched virtual element before the failed element in the matching sequence; and finally uses a physical node to which the successfully matched virtual element is mapped, as the source physical node.

For example, the virtual subnet request may include 10 virtual nodes. In the iteration process of using the mapping algorithm many times to search for mapping resources, the regional management entity may find at most eight physical nodes on the physical network for matching, and cannot find the ninth and tenth matchable physical nodes, and it is possible that in iteration calculation of the mapping algorithm, only the first to the fifth virtual nodes can be matched but resources of several remaining virtual nodes cannot be found, which may be caused by the unreasonable mapping algorithm. In this case, in the sixth and tenth virtual nodes that fail to be matched, the regional management entity should select the matched element (namely, the ninth virtual node) of the longest matching sequence, because the matching sequence is the most reasonable under the constraint condition of the current mapping algorithm. After the failed element of the longest matching sequence is obtained, the physical node matched with the eighth virtual node is selected from the sequence of the failed element as the source physical node requiring migration.

204. Obtain State Information of the Regional Physical Network.

The regional management entity obtains state information of each physical node from physical nodes in the regional physical network.

The state information of the physical node may include: storage capacity of the physical node, available bandwidth resources of the physical node, calculation resources of the physical node, the forwarding speed and link transmission capabilities of the physical node, and so on; the above state information may be obtained selectively according to service requirements corresponding to the regional physical network, where the specific quantity and content included in the state information are not limited.

205. Send a Query Message.

The regional management entity sends a query message to the central management entity, querying for information of a virtual element corresponding to the source physical node.

The query message may carry state information of the source physical node, so that the central management entity determines that the source physical node needs to perform virtual network migration.

206. Receive Information of the Virtual Element Corresponding to the Source Physical Node.

The regional management entity receives information of the virtual element corresponding to the source physical node, which is returned by the central management entity, and obtains information of the virtual network bearing the virtual element from information of the virtual element.

There may be multiple virtual elements which correspond to different virtual networks, respectively.

207. Reconstruct a Mapping Relationship.

The regional management entity reconstructs the mapping relationship between the regional physical network and each virtual network according to the state information and information of the virtual elements to obtain a new mapping relationship.

The process of reconstructing the mapping relationship between the regional physical network and each virtual network may be specifically: obtaining an unoccupied physical node in the regional physical network from each piece of state information of the regional physical network, where the unoccupied physical node is a physical node that can execute virtual network migration, specifically: setting a threshold for each piece of state information according to the service requirement, detecting state information of each physical node, and if none of several pieces of state information of the service requirement exceeds the preset threshold, determining that the physical node is not occupied; meanwhile, setting the source physical node as an occupied physical node and not including the source physical node into mapping calculation; detecting, according to the obtained information of virtual element and information of the virtual network, physical resource occupied by the virtual element in the virtual network, setting the allocation weight of the virtual element according to the physical resource information, performing sorting according to the weight of each virtual element in the virtual network, then sorting unoccupied physical nodes in the regional physical network according to the state information, finally, matching the virtual element requiring the most physical resources (namely, the maximum weight) with a physical node having the most idle resources, and if the matching is successful, performing matching according to the sorting of the virtual element and the physical node until all virtual nodes are completely matched, and obtaining a new mapping relationship between the virtual network and the regional physical network.

The above describes an application scenario in the embodiment of the present disclosure only by using some examples. It may be understood that in an actual application, there may be more application scenarios, which are not limited herein.

208. Select a Mapping Relationship with Minimum Migration Consumption.

The regional management entity compares migration consumption of each virtual network, and selects a mapping relationship with minimum migration consumption from the mapping relationships of the virtual networks as a mapping relationship for executing migration.

The migration consumption may include: mapping times of nodes and links.

After the regional management entity reconstructs the mapping relationship by performing mapping calculation, the virtual network to which each virtual element corresponding to the source physical node belongs is matched with a new mapping relationship. At this time, the current mapping relationships of the virtual networks (namely, mapping relationships between the regional physical network and virtual networks before migration) are obtained; migration consumption is calculated for the virtual networks one by one according to the reconstructed mapping relationships and the current mapping relationships, and migration consumption of each virtual network is compared; finally, a mapping relationship of the virtual network with minimum migration consumption is selected as a mapping relationship for executing migration.

The source physical node generally includes virtual elements of multiple virtual networks (one virtual network corresponds to one virtual element). During migration, generally the load of the current source physical node can be migrated only by migrating the virtual elements in a virtual network. Therefore, after the mapping relationships of each virtual network are obtained, a virtual network with minimum migration consumption is selected for migration. In an actual application, two virtual networks may need to be migrated. In this case, according to the migration method in the embodiment of the present disclosure, a mapping relationship with minimum migration consumption is selected from all reconstructed mapping relationships as a mapping relationship for executing migration. First one virtual network is migrated, and then a mapping relationship with minimum migration consumption is selected from the remaining reconstructed mapping relationships as a mapping relationship for executing migration, for migration of a second virtual network. Similarly, if multiple virtual networks need to be migrated, the migration process may be executed according to the above method.

209. Determine Whether the Request can be Satisfied.

The regional management entity determines whether the regional physical network, after migration is performed according to the mapping relationship for executing migration, can satisfy the virtual subnet request; and if not, triggers step 207 for reconstructing mapping relationships again; if so, triggers step 210 for continuing to execute the step of virtual network migration.

After obtaining the mapping relationship for executing migration, the regional management entity reconstructs a physical topology, and searches for a new physical node corresponding to each virtual element; then obtains the current state information of the new physical node; finally, determines, according to the current state information of the new physical node, whether the new physical node can satisfy the mapping requirement of the virtual subnet request (determines whether the available resource of the new physical node is greater than the physical resource required by the virtual element); and if so, triggers step 210 for continuing to execute the step of virtual network migration; or if not, retriggers step 207 for reconstructing mapping relationships again, or triggers step 208 for reselecting a reconstructed mapping relationship, until the new physical node that executes migration satisfies the mapping requirement of the virtual subnet request.

As an optional solution, step 209 is performed to prevent the case that the virtual subnet request still cannot be satisfied after migration due to the unreasonable reconstructed mapping relationship, thereby ensuring effective and reasonable virtual network migration.

210. Send a Feedback Message.

The regional management entity sends a feedback message to the central management entity.

The feedback message carries a mapping relationship for executing migration and a mapping result of the virtual subnet request, so that the central management entity updates the state of the mapping between the regional physical network and the virtual network according to the mapping relationship for executing migration.

211. Send a Migration Instruction.

The regional management entity sends, according to the mapping relationship for executing migration, a migration instruction to a physical node that needs to execute virtual network migration.

After obtaining the mapping relationship for executing migration, the regional management entity searches for a physical node whose matching relationship with the virtual element is changed in the mapping relationship, sends a migration instruction to the source physical node and new physical node corresponding to the virtual element so that a link connection between the source physical node and the new physical node is established, and migrates the data information related to the virtual element on the source physical node to the new physical node. Migration of the virtual element includes migration of the virtual node and migration of the virtual link, for example, virtual node A is migrated from physical node B to physical node C, while virtual link D and virtual link E connecting virtual node A are also migrated to the corresponding physical links connecting physical node C.

After receiving the migration instruction, each new physical node requiring migration may execute a migration process in parallel, that is, each new physical node copies related information, which may improve migration efficiency and ensure that the consumption generated in the migration method of the present disclosure and the consumption in migration of a single node in the prior art are at the same level.

The embodiment of the present disclosure describes in detail the mechanism of virtual network migration triggered when the physical node managed by the regional management entity cannot satisfy the virtual network request; after determining that the physical topology composed of existing regional physical networks cannot satisfy the virtual subnet request, the embodiment of the present disclosure provides an effective mechanism for locating a source physical node, which provides convenience for reconstructing mapping relationships; in addition, after the mapping relationships of each virtual network are determined, virtual network migration is selectively executed, which reduces the overhead caused by network migration while reaching the migration objective; finally, before migration is executed, whether the new physical node requiring migration can satisfy the virtual subnet request is further determined, which ensures effective virtual network migration.

Figure 3:
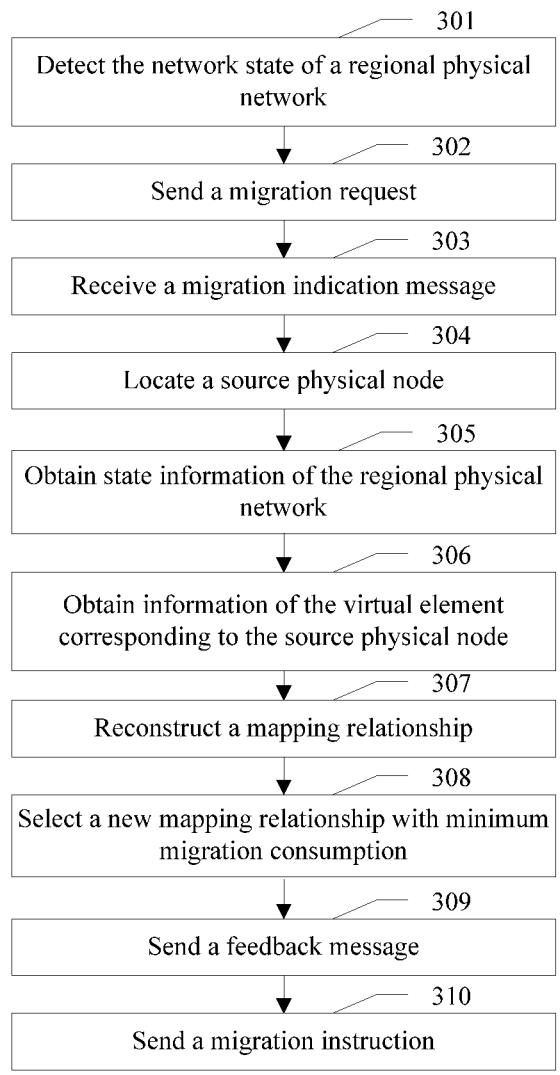
FIG. 3 is another schematic flowchart of a method for virtual network migration according to an embodiment of the present disclosure.

In an actual application, the regional management entity may also actively monitor the state information of the regional physical network. When the regional management entity considers that the state information of the current regional physical network has reached the maximum value of the load, the regional management entity may also trigger virtual network migration. Specifically, as shown in FIG. 3, the method for virtual network migration in the embodiment of the present disclosure includes the following:

301. Detect State of the Regional Physical Network.

A regional management entity detects the state of each physical node in the regional physical network at an interval of a preset duration, and if the state of any physical node reaches a preset threshold, triggers step 302.

The regional management entity sets a threshold for each piece of state information. When a piece of state information reaches a corresponding threshold, it indicates that a network resource of the physical node approaches the maximum value that is bearable by the physical node. In this case, it is necessary to execute virtual network migration.

302. Send a Migration Request.

The regional management entity sends a migration request to a central management entity.

The migration request may carry state information of the physical node whose state information exceeds the preset threshold so that the central management entity determines that it is necessary to execute virtual network migration for the physical node. The migration request is used to feed back state information of the regional physical network to the central management entity so that the central management entity sends a migration indication message.

303. Receive a Migration Indication Message.

The regional management entity receives a migration indication message sent by the central management entity, and triggers, according to the migration indication message, step 304 for locating the source physical node.

After the regional management entity sends the migration request to the central management entity, the central management entity determines, according to the state information carried in the migration request, that it is necessary to execute virtual network migration for the physical node whose state information exceeds the preset threshold; then the central management entity sends a migration indication message to the regional management entity, where the migration indication message may carry an identification of the source physical node requiring virtual network migration (namely, the physical node whose state information exceeds the preset threshold), and information of the virtual element corresponding to the source physical node.

304. Locate the Source Physical Node.

The regional management entity locates the source physical node in the regional physical network according to a virtual subnet request.

The regional management entity extracts the identification of the source physical node requiring virtual network migration from the migration indication message, and triggers the step of executing virtual network migration.

305. Obtain State Information of the Regional Physical Network.

The regional management entity obtains state information of each physical node from physical nodes in the regional physical network.

The state information of the physical node may include: storage capacity of the physical node, available bandwidth resources of the physical node, calculation resources of the physical node, the forwarding speed and link transmission capabilities of the physical node, and so on; the above state information may be obtained selectively according to service requirements corresponding to the regional physical network, where the specific quantity and content included in the state information are not limited.

306. Obtain Information of the Virtual Element Corresponding to the Source Physical Node.

The regional management entity obtains information of the virtual element corresponding to each virtual network on the source physical node from the central management entity, and obtains information of the virtual network bearing the virtual element from information of the virtual element.

If the central management entity carries information of the virtual element corresponding to the source physical node in the migration indication message, the regional management entity may obtain information of the virtual element by extraction from the migration indication message; if the central management entity does not carry information of the virtual element corresponding to the source physical node in the migration indication message, the regional management entity may obtain information of the virtual element by sending a query message to the central management entity. The specific method used for obtaining information of the virtual element corresponding to the source physical node may be decided according to the actual condition, and is not limited herein.

307. Reconstruct a Mapping Relationship.

The regional management entity reconstructs the mapping relationship between the regional physical network and each virtual network according to the state information and information of the virtual elements to obtain a new mapping relationship.

For details about how to construct the mapping relationship between the regional physical network and each virtual network, reference may be made to the content described in step 207, which is not described herein.

308. Select a Mapping Relationship with Minimum Migration Consumption.

The regional management entity compares migration consumption of each virtual network, and selects a mapping relationship with minimum migration consumption from the mapping relationships of the virtual networks as a mapping relationship for executing migration.

The migration consumption may include: mapping times of nodes and links.

After the regional management entity reconstructs the mapping relationship by performing mapping calculation, the virtual network that each virtual element corresponding to the source physical node bears is matched with a new mapping relationship. At this time, the current mapping relationships of the virtual networks (namely, mapping relationships between the regional physical network and virtual networks before migration) are obtained; migration consumption is calculated for the virtual networks one by one according to the reconstructed mapping relationships and the current mapping relationships, and migration consumption of each virtual network is compared; finally, a mapping relationship of the virtual network with minimum migration consumption is selected as a mapping relationship for executing migration.

The source physical node generally includes virtual elements of multiple virtual networks. During migration, generally the load of the current source physical node can be migrated only by migrating the virtual elements in a virtual network. Therefore, after the mapping relationships of each virtual network are obtained, a virtual network with minimum migration consumption is selected for migration. In an actual application, two virtual networks may need to be migrated. In this case, according to the migration method in the embodiment of the present disclosure, a mapping relationship with minimum migration consumption is selected from all reconstructed mapping relationships as a mapping relationship for executing migration. First a virtual network is migrated, and then a mapping relationship with minimum migration consumption is selected from the remaining reconstructed mapping relationships as a mapping relationship for executing migration, for migration of the second virtual network. Similarly, if multiple virtual networks need to be migrated, the migration process may be executed according to the above method.

309. Send a Feedback Message.

The regional management entity sends a feedback message to the central management entity.

The feedback message carries a mapping relationship for executing migration and a mapping result of the virtual subnet request, so that the central management entity updates the state of the mapping between the regional physical network and the virtual network according to the mapping relationship for executing migration.

310. Send a Migration Instruction.

The regional management entity sends, according to the mapping relationship for executing migration, a migration instruction to a physical node that needs to execute virtual network migration.

After obtaining the mapping relationship for executing migration, the regional management entity searches for a physical node whose matching relationship with the virtual element is changed in the mapping relationship, sends a migration instruction to the source physical node and new physical node corresponding to the virtual element so that a link connection between the source physical node and the new physical node is established, and migrates the data information related to the virtual element on the source physical node to the new physical node. Migration of the virtual element includes migration of the virtual node and migration of the virtual link.

After receiving the migration instruction, each new physical node requiring migration may execute a migration process in parallel, that is, each new physical node copies related information, which may improve migration efficiency and ensure that the consumption generated in the migration method of the present disclosure and the consumption in migration of a single node in the prior art are at the same level.

The embodiment of the present disclosure provides a mechanism for detecting state information of the regional physical network, and provides a method for virtual network migration corresponding to the mechanism, so that the virtual network migration triggered by the regional physical network by monitoring state information can be implemented effectively.

Figure 4:
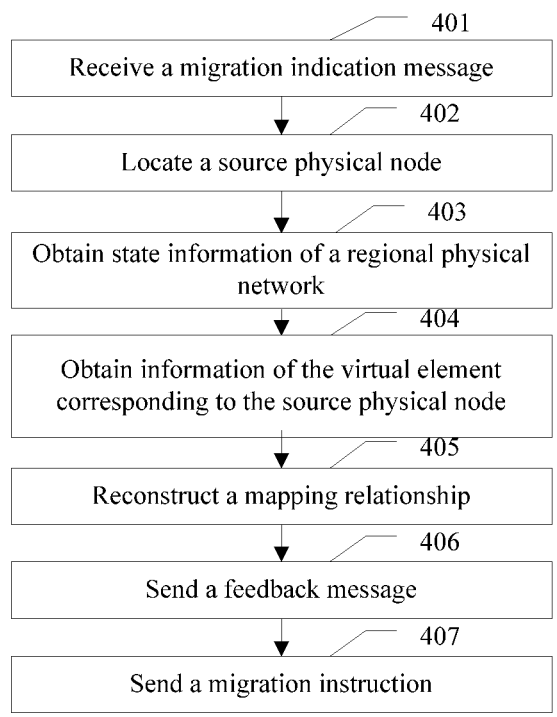
FIG. 4 is another schematic flowchart of a method for virtual network migration according to an embodiment of the present disclosure.

In an actual application, due to obsoleteness of a network device, a physical node corresponding to the obsolete network device needs to be upgraded. In this case, the administrator of the network device may initiate virtual network migration. Specifically, as shown in FIG. 4, the method for virtual network migration in the embodiment of the present disclosure includes the following:

401. Receive a Migration Indication Message.

A regional management entity receives a migration indication message sent by a central management entity, and triggers, according to the migration indication message, step 402 for locating a source physical node.

After determining that it is necessary to upgrade the device, the administrator of the network device sets a source physical node requiring virtual network migration in the central management entity; then the central management entity sends a migration indication message to the regional management entity, where the migration indication message may carry an identification of the source physical node requiring virtual network migration, and information of a virtual element corresponding to the source physical node.

402. Locate the Source Physical Node.

The regional management entity locates the source physical node in the regional physical network according to a virtual subnet request.

The regional management entity extracts the identification of the source physical node requiring virtual network migration from the migration indication message, and triggers the step of executing virtual network migration.

403. Obtain State Information of the Regional Physical Network.

The regional management entity obtains state information of each physical node from physical nodes in the regional physical network.

The state information of the physical node may include: storage capacity of the physical node, available bandwidth resources of the physical node, calculation resources of the physical node, the forwarding speed and link transmission capabilities of the physical node, and so on; the above state information may be obtained selectively according to service requirements corresponding to the regional physical network, where the specific quantity and content included in the state information are not limited.

404. Obtain Information of the Virtual Element Corresponding to the Source Physical Node.

The regional management entity obtains information of the virtual element corresponding to each virtual network on the source physical node from the central management entity, and obtains information of the virtual network bearing the virtual element from information of the virtual element.

If the central management entity carries information of the virtual element corresponding to the source physical node in the migration indication message, the regional management entity may obtain information of the virtual element by extraction from the migration indication message; if the central management entity does not carry information of the virtual element corresponding to the source physical node in the migration indication message, the regional management entity may obtain information of the virtual element by sending a query message to the central management entity. The specific method used for obtaining information of the virtual element corresponding to the source physical node may be decided according to the actual condition, and is not limited herein.

405. Reconstruct a Mapping Relationship.

The regional management entity determines, according to information of the virtual element corresponding to each virtual network and the state information of each physical node in the regional physical network, a physical node that can execute virtual network migration in the regional physical network; reconstructs a mapping relationship between each virtual network and the regional physical network on the physical node that can execute virtual network migration; compares the mapping relationships of each virtual network; and selects a mapping relationship with minimum migration consumption as a mapping relationship for executing migration.

406. Send a Feedback Message.

The regional management entity sends a feedback message to the central management entity.

The feedback message carries a mapping relationship for executing migration and a mapping result of the virtual subnet request, so that the central management entity updates the state of the mapping between the regional physical network and the virtual network according to the mapping relationship for executing migration. Because the physical node is updated and upgraded in the embodiment of the present disclosure, it is necessary to migrate all virtual networks on the source physical node. Therefore, it is necessary to select a mapping relationship repetitively many times and execute virtual network migration many times.

407. Send a Migration Instruction.

The regional management entity sends, according to the mapping relationship for executing migration, a migration instruction to a physical node that needs to execute virtual network migration.

After obtaining the mapping relationship for executing migration, the regional management entity searches for a physical node whose matching relationship with the virtual element is changed in the mapping relationship, sends a migration instruction to the source physical node and new physical node corresponding to the virtual element so that a link connection between the source physical node and the new physical node is established, and migrates the data information related to the virtual element on the source physical node to the new physical node. Migration of the virtual element includes migration of the virtual node and migration of the virtual link.

After receiving the migration instruction, each new physical node requiring migration may execute a migration process in parallel, that is, each new physical node copies related information, which may improve migration efficiency and ensure that the consumption generated in the migration method of the present disclosure and the consumption in migration of a single node in the prior art are at the same level.

In the embodiment of the present disclosure, when the administrator of the network device actively triggers virtual network migration, a corresponding mechanism for the regional management entity to execute virtual network migration is provided, so that the regional management entity still can use physical network resources reasonably in the case that the central management entity actively initiates virtual network migration.

The embodiment of the method for virtual network migration according to the present disclosure provides a series of solutions for virtual network migration triggered by various causes, for example, network resources on the physical node cannot satisfy the virtual network request, the network state in the physical network has reached a bottleneck, and the physical node requires device upgrade. The purpose is to generate a mapping relationship between the virtual network and the physical network by local remapping calculation according to different trigger causes of migration, and determine the virtual network requiring migration according to the difference between the original mapping relationship and the new mapping relationship. Therefore, the matching between the virtual element and the physical node is more reasonable, and the utilization of the physical network is improved.

Figure 5:
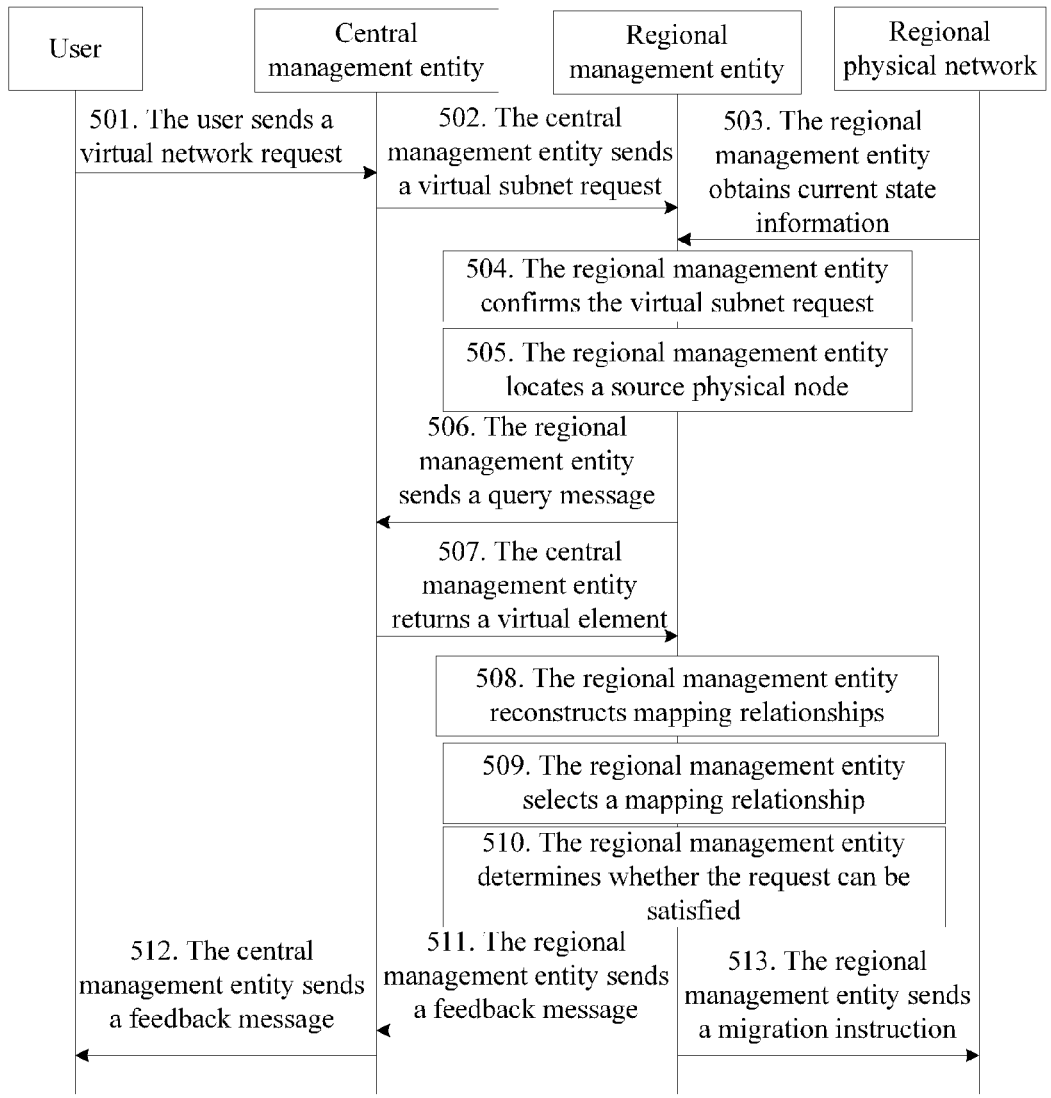
FIG. 5 is a signaling flowchart of a method for virtual network migration according to an embodiment of the present disclosure.

For ease of understanding, the following describes virtual network migration triggered because a physical node cannot satisfy a virtual network request in the above embodiment by using a specific application scenario, as shown in FIG. 5, which is specifically as follows:

501. A User Sends a Virtual Network Request.

The user sends a virtual network request to a central management entity, requesting allocation of resources of a virtual network.

502. The Central Management Entity Sends a Virtual Subnet Request.

After receiving the virtual network request sent by the user, the central management entity splits the virtual network request into several virtual subnet requests, and sends the virtual subnet requests to corresponding regional management entities for allocating resources of virtual subnets.

503. A Regional Management Entity Obtains Current State Information.

The regional management entity obtains the current state information of each physical node from the regional physical network after receiving the virtual subnet request.

504. The Regional Management Entity Determines the Virtual Subnet Request.

The regional management entity constructs a physical topology according to the current state information and the virtual subnet request, and then uses a mapping algorithm locally preset by the regional management entity to execute mapping matching between a virtual subnet and the regional physical network. In the matching process, if the regional management entity finds that the state information of the physical network cannot satisfy the mapping requirement of the virtual subnet request, resources of some physical nodes in the regional physical network in the region are insufficient, and the virtual networks that the physical nodes bear need to be migrated. Therefore, the step of locating the physical node requiring migration is triggered.

Assuming that there are six virtual elements requiring allocation in the virtual subnet request, the regional management entity sorts the virtual elements according to the weight of the state information, and obtains the sequence: X1, X2, X3, X4, X5, and X6; then matches the mapping according to the sorting result, in the physical topologies obtained in order. Assuming that X5 cannot be matched with a suitable physical node (the state information of the next-hop physical node cannot satisfy resource requirements of X5) in the matching process, step 505 is triggered for locating the source physical node requiring migration.

505. The Regional Management Entity Locates the Source Physical Node.

The regional management entity finds a failed element X5 in the sequence, then finds, according to the mapping matching process, a physical node D4 successfully matched with a virtual element X4, and therefore determines that the physical node D4 is a source physical node.

506. The Regional Management Entity Sends a Query Message.

The regional management entity sends a query message to the central management entity, where the query message carries state information of the source physical node D4, so that the central management entity determines that the source physical node D4 requires virtual network migration.

507. The Central Management Entity Returns Information of Virtual Elements.

After receiving the query message, the central management entity determines that the source physical node D4 requires virtual network migration, queries for the mapping state of the source physical node D4, and extracts information of virtual elements Yi, Zi, and Hi that are allocated to the source physical node D4, where the virtual elements correspond to virtual networks $VNET_Y$, $VNET_Z$, and $VNET_H$, respectively; then the central management entity returns information of the virtual elements Yi, Zi, and Hi, and information of their virtual networks $VNET_Y$, $VNET_Z$, and $VNET_H$ to the regional management entity.

508. The Regional Management Entity Reconstructs Mapping Relationships.

The regional management entity reconstructs a physical topology in the domain of the regional management entity, specifically: marking the source physical node D4 as an occupied resource, then marking, according to the state information of the regional physical network, other physical nodes whose state information cannot satisfy requirements as occupied resources; and then reconstructing a new physical topology on unoccupied resources.

The regional management entity matches the mapping of the virtual networks $VNET_Y$, $VNET_Z$, and $VNET_H$ on the new physical topology according to the preset mapping algorithm (specifically referring to the mapping process in step 504), and obtains new mapping relationships $R_Y$, $R_Z$, and $R_H$.

509. The Regional Management Entity Selects a Mapping Relationship.

The regional management entity compares migration consumption of each virtual network, and selects a mapping relationship with minimum migration consumption from the mapping relationships of the virtual networks as a mapping relationship for executing migration.

The comparing process may be:

obtaining the current mapping relationships $r_Y$, $r_Z$, and $r_H$ of the virtual networks $VNET_Y$, $VNET_Z$, and $VNET_H$; detecting migration consumption (considering the mapping times of nodes and links) generated by conversion from the mapping relationship $r_Y$ to $R_Y$, conversion from $r_Z$ to $R_Z$, and conversion from $r_H$ to $R_H$, and if the migration consumption generated by conversion from the mapping relationship $r_Z$ to the mapping relationship $R_Z$ is the least, selecting the mapping relationship $R_Z$ as a mapping relationship for executing migration

510. The Regional Management Entity Determines Whether the Request can be Satisfied.

The regional management entity reconstructs a physical topology after obtaining the mapping relationship $R_Z$ for executing migration, and finds a new physical node Di corresponding to each virtual element Xi; then obtains the current state information of the new physical node Di; finally, determines whether available resources of the new physical node Di are more than physical resources required by the virtual element Xi, and if so, triggers step 511 for continuing to execute virtual network migration; if not, retriggers step 508 for reconstructing mapping relationships again, or triggers step 509 for reselecting a reconstructed mapping relationship until the new physical node Di that executes migration satisfies the mapping requirement of the virtual subnet request.

511. The Regional Management Entity Sends a Feedback Message.

After the regional management entity determines that the mapping relationship $R_Z$ for executing migration can satisfy the mapping requirement of the virtual subnet request, the regional management entity sends a feedback message to the central management entity.

The feedback message carries a mapping relationship for executing migration and a mapping result of the virtual subnet request, so that the central management entity updates the state of the mapping between the regional physical network and the virtual network according to the mapping relationship for executing migration.

512. The Central Management Entity Sends a Feedback Message.

After receiving the feedback message sent by the regional management entity, the central management entity extracts the mapping relationship for executing migration and the mapping result of the virtual subnet request, which are carried in the virtual subnet request, and sends a feedback message to the user, where the feedback message carries the processing result of the virtual network request.

513. The Regional Management Entity Sends a Migration Instruction.

The regional management entity sends, according to the mapping relationship for executing migration, a migration instruction to a physical node that needs to execute virtual network migration so that a link connection is established between the source physical node and the new physical node corresponding to the virtual element, and migrates the data information related to the virtual element on the source physical node to the new physical node.

The above describes an application scenario in the embodiment of the present disclosure only by using some examples. It may be understood that in an actual application, there may be more application scenarios, which are not limited herein.

Figure 6:
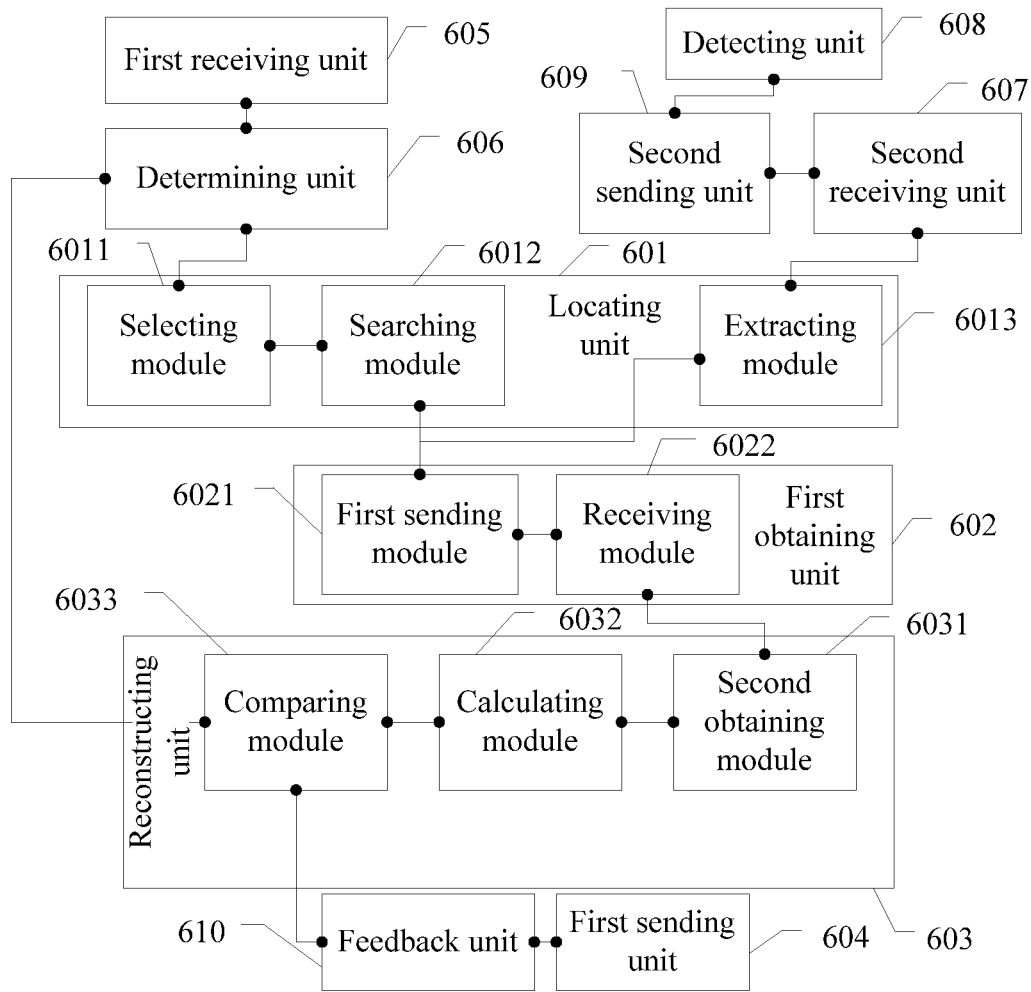
FIG. 6 is a schematic logical structural diagram of a regional management entity according to an embodiment of the present disclosure.

The following describes an embodiment of a regional management entity according to the present disclosure, which is used to execute the above method for virtual network migration and the logical structure of which is shown in FIG. 6. the regional management entity in the embodiment of the present disclosure includes: a locating unit 601 configured to locate a source physical node in a regional physical network; a first obtaining unit 602 configured to obtain information of a virtual element corresponding to each virtual network on the source physical node and state information of each physical node in the regional physical network; a reconstructing unit 603 configured to determine, according to information of the virtual element corresponding to each virtual network and the state information of each physical node in the regional physical network, a physical node that can execute virtual network migration in the regional physical network, reconstruct a mapping relationship between each virtual network and the regional physical network on the physical node that can execute virtual network migration, compare the mapping relationships of each virtual network, and select a mapping relationship with minimum migration consumption as a mapping relationship for executing migration; and a first sending unit 604 configured to send, according to the mapping relationship for executing migration, a migration instruction to a physical node that needs to execute virtual network migration.

Optionally, the locating unit 601 in the embodiment of the present disclosure may include: a selecting module 6011 configured to select a failed element of a longest matching sequence in a virtual subnet request; a searching module 6012 configured to search for a successfully matched virtual element before the failed element in the matching sequence, and use a physical node to which the successfully matched virtual element is mapped, as the source physical node; and an extracting module 6013 configured to extract an identification of the source physical node from a migration indication message, and perform location according to the identification of the source physical node.

Optionally, the first obtaining unit 602 in the embodiment of the present disclosure may include: a first sending module 6021 configured to send a query message to a central management entity, where the query message is used to query information of a virtual element corresponding to the source physical node; and a receiving module 6022 configured to receive information of the virtual element corresponding to the source physical node, which is returned by the central management entity.

Optionally, the reconstructing unit 603 in the embodiment of the present disclosure may include: a second obtaining module 6031 configured to obtain a current mapping relationship corresponding to the virtual network; a calculating module 6032 configured to calculate migration consumption according to the current mapping relationship and reconstructed mapping relationship; and a comparing module 6033 configured to compare migration consumption of each virtual network, and select a mapping relationship with minimum migration consumption from the mapping relationships of the virtual networks as a mapping relationship for executing migration.

Optionally, the regional management entity in the embodiment of the present disclosure may further include: a first receiving unit 605 configured to receive a virtual subnet request sent by the central management entity; a determining unit 606 configured to determine, according to the current state information, whether a current regional physical network can satisfy a mapping requirement of the virtual subnet request, and if not, trigger the locating unit; a second receiving unit 607 configured to receive a migration indication message sent by the central management entity, and trigger the locating unit 601 according to the migration indication message; a detecting unit 608 configured to detect the state information of each physical node in the regional physical network at an interval of a preset duration, and if the state information of any physical node reaches a preset threshold, trigger a second sending unit 609; the second sending unit 609 configured to send a migration request to the central management entity, where the migration request is used to feed back state information corresponding to the physical node to the central management entity, so that the central management entity sends the migration indication message; and a feedback unit 610 configured to send a feedback message to the central management entity, where the feedback message carries the mapping relationship for executing migration, so that the central management entity updates a state of a mapping between the regional physical network and the virtual network according to the mapping relationship for executing migration.

The specific process of interaction between units in the regional management entity in the embodiment of the present disclosure is as follows:

1. Trigger Cause: The Physical Node Cannot Satisfy a Virtual Network Request.

The first receiving unit 605 receives a virtual subnet request sent by the central management entity. After receiving a virtual network request sent by a user, the central management entity splits the virtual network request into several virtual subnet requests, and sends the virtual subnet requests to corresponding regional management entities for allocating resources of virtual subnets.

After the regional management entity receives the virtual subnet request, the determining unit 606 first obtains state information of the regional physical network, and constructs a physical topology according to the state information and the virtual subnet request, and then uses a mapping algorithm locally preset by the regional management entity to execute the mapping matching between a virtual subnet and the regional physical network; in the matching process, if it is found that the state information of the regional physical network cannot satisfy the mapping requirement of the virtual subnet request, the determining unit 606 determines that the current regional network cannot satisfy the mapping requirement of the virtual subnet request, and the locating unit 601 is triggered to locate, according to the virtual subnet request, the source physical node in the regional physical network. The locating method may be: First the selecting module 6011 selects a failed element of a longest matching sequence in the virtual subnet request, where the failed element is a virtual element that fails to be matched in the process of matching the virtual subnet; then the searching module 6012 searches for a successfully matched virtual element before the failed element in the matching sequence, and uses a physical node to which the successfully matched virtual element is mapped, as the source physical node.

After the source physical node is located, the first obtaining unit 602 obtains state information of each physical node from each physical node of the regional physical network; then the first sending module 6021 sends a query message to the central management entity, querying for information of the virtual element corresponding to the source physical node. The query message carries state information of the source physical node, so that the central management entity determines that the source physical node needs to perform virtual network migration. The receiving module 6022 of the first obtaining unit 602 receives information of the virtual element corresponding to the source physical node, which is returned by the central management entity, and obtains the virtual network bearing the virtual element from the virtual element.

After information of the virtual element corresponding to the source physical node and the state information of the regional physical network are obtained, the reconstructing unit 603 determines, according to information of the virtual element corresponding to each virtual network and the state information of each physical node in the regional physical network, a physical node that can execute virtual network migration in the regional physical network; reconstructs a mapping relationship between each virtual network and the regional physical network on the physical node that can execute virtual network migration; compares the mapping relationships of each virtual network; and selects a mapping relationship with minimum migration consumption as a mapping relationship for executing migration. The process of selecting a mapping relationship for executing migration may be specifically as follows: The second obtaining module 6031 obtains the mapping relationships of the virtual networks, and then the calculating module 6032 calculates migration consumption according to the current mapping relationships and the reconstructed mapping relationships; finally, the comparing module 6033 compares migration consumption of each virtual network, and selects a mapping relationship with minimum migration consumption from the mapping relationships of the virtual networks as a mapping relationship for executing migration.

Optionally, after the mapping relationship for executing migration is determined, the regional management entity may further trigger the determining unit 606 to determine whether the regional physical network, after migration is performed according to the mapping relationship for executing migration, can satisfy the virtual subnet request; and if not, continues to trigger the reconstructing unit 603; if so, triggers the feedback unit 610 to send a feedback message to the central management entity, where the feedback message carries the mapping relationship so that the central management entity updates the state of the mapping between the regional physical network and the virtual network according to the mapping relationship for executing migration.

After the mapping relationship for executing migration is obtained, the first sending unit 604 sends, according to the mapping relationship for executing migration, a migration instruction to the physical node that needs to execute virtual network migration.

2. Trigger Cause: The Regional Management Entity Detects that the Network State of the Current Regional Physical Network has Reached a Bottleneck.

The detecting unit 608 detects the state information of each physical node in the regional physical network at an interval of a preset duration, and if the state information of any physical node reaches a preset threshold, triggers the second sending unit 609. The state information may include: the storage capacity, calculation resources, and forwarding speed of the current physical node, link transmission capabilities and available bandwidth resources of the current regional physical network, and so on; the above state information may be obtained selectively according to service requirements corresponding to the regional physical network, where the specific content included in the state information is not limited. The regional management entity sets a threshold for each piece of state information. When a piece of state information reaches a corresponding threshold, it indicates that a network resource of the physical node approaches the maximum value that is bearable by the physical node. In this case, it is necessary to execute virtual network migration.

The migration request sent by the second sending unit 609 may carry state information of the physical node whose state information exceeds the preset threshold so that the central management entity determines that it is necessary to execute virtual network migration for the physical node. The migration request is used to feed back state information of the regional physical network to the central management entity so that the central management entity sends a migration indication message. After the regional management entity sends the migration request to the central management entity, the central management entity determines, according to the state information carried in the migration request, that it is necessary to execute virtual network migration for the physical node whose state information exceeds the preset threshold; then the central management entity sends a migration indication message to the regional management entity, where the migration indication message may carry an identification of the source physical node requiring virtual network migration, and information of the virtual element corresponding to the source physical node.

After the central management entity sends the migration indication message, the second receiving unit 607 receives the migration indication message sent by the central management entity, and triggers, according to the migration indication message, the locating unit 601 to locate the source physical node. Specifically, the extracting module 6013 extracts the identification of the source physical node from the migration indication message.

After the source physical node is located, the first obtaining unit 602 obtains the state information of each physical node from each physical node of the regional physical network.

Then, optionally, if the central management entity carries information of the virtual element corresponding to the source physical node in the migration indication message, the first obtaining unit 602 may obtain information of the virtual element by direct extraction from the migration indication message.

If the central management entity does not carry information of the virtual element corresponding to the source physical node in the migration indication message, the first sending module 6021 sends a query message to the central management entity, querying for information of the virtual element corresponding to the source physical node. The query message carries state information of the source physical node, so that the central management entity determines that the source physical node needs to perform virtual network migration. The receiving module 6022 of the first obtaining unit 602 receives information of the virtual element corresponding to the source physical node, which is returned by the central management entity, and obtains the virtual network bearing the virtual element from information of the virtual element.

After information of the virtual element corresponding to the source physical node and the state information of the regional physical network are obtained, the reconstructing unit 603 determines, according to information of the virtual element corresponding to each virtual network and the state information of each physical node in the regional physical network, a physical node that can execute virtual network migration in the regional physical network; reconstructs a mapping relationship between each virtual network and the regional physical network on the physical node that can execute virtual network migration; compares the mapping relationships of each virtual network; and selects a mapping relationship with minimum migration consumption as a mapping relationship for executing migration. The process of selecting a mapping relationship for executing migration may be specifically as follows: The second obtaining module 6031 obtains the mapping relationships of the virtual networks, and then the calculating module 6032 calculates migration consumption according to the current mapping relationships and the reconstructed mapping relationships; finally, the comparing module 6033 compares migration consumption of each virtual network, and selects a mapping relationship with minimum migration consumption from the mapping relationships of the virtual networks as a mapping relationship for executing migration.

After the mapping relationship for executing migration is obtained, the first sending unit 604 sends, according to the mapping relationship for executing migration, a migration instruction so that the physical node requiring migration executes virtual network migration.

3. Trigger Cause: The Administrator of a Network Device May Actively Initiate Virtual Network Migration.

The second receiving unit 607 receives a migration indication message sent by the central management entity, and triggers, according to the migration indication message, the locating unit 601 to locate a source physical node. Specifically, the extracting module 6013 extracts the identification of the source physical node from the migration indication message. After determining that it is necessary to upgrade the device, the administrator of the network device sets a source physical node requiring virtual network migration in the central management entity; then the central management entity sends a migration indication message to the regional management entity, where the migration indication message may carry the identification of the source physical node requiring virtual network migration, and information of the virtual element corresponding to the source physical node.

After the source physical node is located, the first obtaining unit 602 obtains the state information of each physical node from each physical node of the regional physical network.

Then, optionally, if the central management entity carries information of the virtual element corresponding to the source physical node in the migration indication message, the first obtaining unit 602 may obtain information of the virtual element by direct extraction from the migration indication message.

If the central management entity does not carry information of the virtual element corresponding to the source physical node in the migration indication message, the first sending module 6021 sends a query message to the central management entity, querying for information of the virtual element corresponding to the source physical node. The query message carries state information of the source physical node, so that the central management entity determines that the source physical node needs to perform virtual network migration. The receiving module 6022 of the first obtaining unit 602 receives information of the virtual element corresponding to the source physical node, which is returned by the central management entity, and obtains the virtual network bearing the virtual element from the virtual element.

After information of the virtual element corresponding to the source physical node and the state information of the regional physical network are obtained, the reconstructing unit 603 determines, according to information of the virtual element corresponding to each virtual network and the state information of each physical node in the regional physical network, a physical node that can execute virtual network migration in the regional physical network; reconstructs a mapping relationship between each virtual network and the regional physical network on the physical node that can execute virtual network migration; compares the mapping relationships of each virtual network; and selects a mapping relationship with minimum migration consumption as a mapping relationship for executing migration. The process of selecting a mapping relationship for executing migration may be specifically as follows: The second obtaining module 6031 obtains the mapping relationships of the virtual networks, and then the calculating module 6032 calculates migration consumption according to the current mapping relationships and the reconstructed mapping relationships; finally, the comparing module 6033 compares migration consumption of each virtual network, and selects a mapping relationship with minimum migration consumption from the mapping relationships of the virtual networks as a mapping relationship for executing migration.

After the mapping relationship for executing migration is obtained, the first sending unit 604 sends, according to the mapping relationship for executing migration, a migration instruction so that the physical node requiring migration executes virtual network migration.

Figure 7:
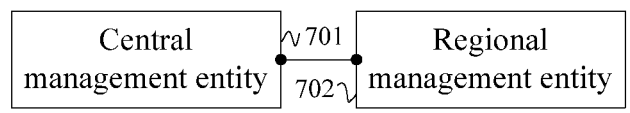
FIG. 7 is a schematic logical structural diagram of a system for virtual network migration according to an embodiment of the present disclosure.

The following describes an embodiment of a system for virtual network migration according to the present disclosure, which is used to execute the above method for virtual network migration and the logical structure of which is shown in FIG. 7. the system for virtual network migration in the embodiment of the present disclosure includes: a regional management entity 702 and a central management entity 701.

The central management entity 701 is configured to provide information of a virtual element corresponding to a source physical node for the regional management entity 702.

The regional management entity 702 is configured to: locate a source physical node in a regional physical network, where the source physical node is a physical node that triggers virtual network migration; obtain information of a virtual element corresponding to each virtual network on the source physical node and state information of each physical node in the regional physical network; determine, according to information of the virtual elements and the state information, a physical node that can execute virtual network migration in the regional physical network; reconstruct a mapping relationship between each virtual network and the regional physical network on the physical node that can execute virtual network migration; compare the mapping relationships of each virtual network; select a mapping relationship with minimum migration consumption as a mapping relationship for executing migration; and send, according to the mapping relationship for executing migration, a migration instruction to a physical node that needs to execute virtual network migration.

Optionally, if the trigger cause is that the physical node cannot satisfy a virtual network request, the system for virtual network migration according to the present disclosure may further include the following steps:

The providing, by the central management entity 701, information of a virtual element corresponding to a source physical node for the regional management entity 702, is specifically as follows:

The central management entity 701 receives a virtual network request sent by a user; splits the virtual network request into virtual subnet requests; sends a virtual subnet request to the regional management entity 702 corresponding to the virtual subnet request; receives a query message sent by the regional management entity 702, where the query message is used to query information of a virtual element corresponding to the source physical node requiring migration; responds to the query message, and sends information of the virtual element to the regional management entity 702, so that the regional management entity 702 reconstructs, according to information of the virtual element, a mapping relationship between the regional physical network and the virtual network.

Before the regional management entity 702 locates the source physical node requiring migration, the system includes the following:

The regional management entity 702 receives the virtual subnet request sent by the central management entity 701; determines, according to current state information, whether a current regional physical network can satisfy the mapping requirement of the virtual subnet request, and if not, triggers the step of locating the source physical node in the regional physical network.

The obtaining, by the regional management entity 702, information of the virtual element of the source physical node provided by the central management entity 701, includes the following:

The regional management entity 702 sends a query message to the central management entity 701, where the query message is used to query information of a virtual element corresponding to each virtual network on the source physical node; and receives information of the virtual element corresponding to each virtual network on the source physical node, which is returned by the central management entity 701.

After the regional management entity 702 selects a mapping relationship with minimum migration consumption as a mapping relationship for executing migration, the system includes the following:

The regional management entity 702 sends a feedback message to the central management entity, where the feedback message carries the mapping relationship for executing migration, so that the central management entity 701 updates a state of a mapping between the regional physical network and the virtual network according to the mapping relationship for executing migration.

After the central management entity 701 sends information of the virtual element to the regional management entity 702, the system includes the following:

The central management entity 701 receives the feedback message sent by the regional management entity 702; and updates the state of the mapping between the regional physical network and the virtual network according to the mapping relationship for executing migration which is carried in the feedback message.

Optionally, if the trigger cause is that the regional management entity 702 detects that the network state of the current regional physical network has reached a bottleneck, the system for virtual network migration according to the present disclosure may further include the following steps:

The providing, by the central management entity 701, information of a virtual element corresponding to the source physical node for the regional management entity 702, includes the following:

The central management entity 701 sends the migration indication message to the regional management entity 702, so that the regional management entity 702 performs virtual network migration according to the migration indication message, where the migration indication message carries an identification of a source physical node requiring migration.

Before the regional management entity 702 locates the source physical node in the regional physical network, the system further includes the following:

The regional management entity 702 receives the migration indication message sent by the central management entity 701, and triggers, according to the migration indication message, the step of locating the source physical node in the regional physical network.

Before the regional management entity 702 receives the migration message sent by the central management entity 701, the system further includes the following:

The regional management entity 702 detects the state of each physical node in the regional physical network at an interval of a preset duration, and if the state of any physical node reaches a preset threshold, sends a migration request to the central management entity 701, where the migration request is used to feed back the state information to the central management entity 701, so that the central management entity 701 sends the migration indication message.

Before the central management entity 701 sends the migration indication message to the regional management entity 702, the system includes the following:

The central management entity 701 receives the migration request sent by the regional management entity 702.

After the regional management entity 702 reconstructs the mapping relationship between the regional physical network and each virtual network according to the state information and information of the virtual elements to obtain a new mapping relationship, the system includes the following:

The regional management entity 702 sends a feedback message to the central management entity 701, where the feedback message carries the mapping relationship for executing migration, so that the central management entity 701 updates the state of the mapping between the regional physical network and the virtual network according to the mapping relationship for executing migration.

After the central management entity 701 sends the migration indication message to the regional management entity 702, the system includes the following:

The central management entity 701 receives the feedback message sent by the regional management entity 702; and updates the state of the mapping between the regional physical network and the virtual network according to the mapping relationship for executing migration which is carried in the feedback message.

The system for virtual network migration in the embodiment of the present disclosure is applied to the embodiment described in FIG. 5.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated units are implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in a form of a software product. The computer software product is stored in a storage medium and includes several instructions for instructing a computer device (which may be a personal computer, a server, or a network device) to perform all or a part of the steps of the methods described in the embodiments of the present disclosure. The foregoing storage medium includes: any medium that can store program code, such as a Universal Serial Bus (USB) flash disk, a removable hard disk, a read-only memory (ROM), a random access memory (RAM), a magnetic disk, or an optical disk.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for virtual network migration, comprising:
    locating a source physical node in a regional physical network, wherein the source physical node is a physical node that triggers virtual network migration;
    obtaining information of a virtual element corresponding to each virtual network on the source physical node and state information of each physical node in the regional physical network, wherein the state information comprises values for multiple capabilities of each physical node in the regional physical network;
    determining, according to information of the virtual element and the state information, a physical node that can execute virtual network migration in the regional physical network, wherein a threshold is set for each of the multiple capabilities in the state information, and wherein the physical node that can execute the virtual network migration in the regional physical network has values for each of the multiple capabilities that are below the thresholds;
    reconstructing a mapping relationship between each virtual network and the regional physical network on the physical node that can execute virtual network migration;
    comparing the mapping relationships of each virtual network;

selecting a mapping relationship with minimum migration consumption as a mapping relationship for executing migration; and sending, according to the mapping relationship for executing migration, a migration instruction to a physical node that needs to execute virtual network migration.

2. The method according to claim 1, wherein before locating the source physical node in the regional physical network, the method comprises:

receiving a virtual subnet request sent by a central management entity;

determining, according to state information of the regional physical network, whether a current regional physical network can satisfy a mapping requirement of the virtual subnet request; and triggering the step of locating the source physical node in the regional physical network when it is determined that the current regional physical network cannot satisfy the mapping requirement of the virtual subnet request.

3. The method according to claim 2, wherein locating the source physical node in the regional physical network comprises:

selecting a failed element of a longest matching sequence in the virtual subnet request;

searching for a successfully matched virtual element before the failed element in the matching sequence; and using a physical node to which the successfully matched virtual element is mapped as the source physical node.

4. The method according to claim 2, wherein after selecting the mapping relationship with minimum migration consumption as the mapping relationship for executing migration, the method comprises:

searching for a new physical node corresponding to the virtual network in the mapping relationship for executing migration;

obtaining current state information of the new physical node;

determining, according to the current state information of the new physical node, whether the new physical node can satisfy the mapping requirement of the virtual subnet request;

triggering the step of sending, according to the mapping relationship for executing migration, a migration instruction to a physical node that needs to execute virtual network migration when it is determined that the new physical node can satisfy the mapping requirement of the virtual subnet request; and retriggering the step of reconstructing the mapping relationship between each virtual network and the regional physical network on the physical node that can execute virtual network migration when it is determined that the new physical node cannot satisfy the mapping requirement of the virtual subnet request.

5. The method according to claim 1, wherein obtaining information of the virtual element corresponding to each virtual network on the source physical node comprises:

sending a query age to a central management entity, wherein the query message is used to query information of a virtual element corresponding to each virtual network on the source physical node; and receiving information of the virtual element corresponding to each virtual network on the source physical node that is returned by the central management entity.

6. The method according to claim 1, wherein before locating the source physical node in the regional physical network, the method comprises:

receiving a migration indication message sent by a central management entity; and triggering, according to the migration indication message, the step of locating the source physical node in the regional physical network.

7. The method according to claim 6, wherein locating the source physical node in the regional physical network comprises:

extracting an identification of the source physical node from the migration indication message; and performing location according to the identification of the source physical node.

8. The method according to claim 6, wherein before receiving the migration indication message sent by the central management entity, the method comprises:

detecting the state of each physical node in the regional physical network at an interval of a preset duration; and sending a migration request to the central management entity when it is detected that the state of any physical node reached the preset threshold, and wherein the migration request is used to feed back state information corresponding to the physical node to the central management entity such that the central management entity sends the migration indication message.

9. The method according to claim 1, wherein comparing the mapping relationships of each virtual network and selecting the mapping relationship with minimum migration consumption as the mapping relationship for executing migration comprise:

obtaining a current mapping relationship corresponding to the virtual network;

calculating migration consumption according to the current mapping relationship and reconstructed mapping relationship;

comparing migration consumption of each virtual network; and selecting a mapping relationship with minimum migration consumption from the mapping relationships of the virtual networks as a mapping relationship for executing migration.

10. The method according to claim 1, wherein after selecting the mapping relationship with minimum migration consumption as the mapping relationship for executing migration, the method comprises sending a feedback message to the central management entity, and wherein the feedback message carries the mapping relationship for executing migration such that the central management entity updates a state of a mapping between the regional physical network and the virtual network according to the mapping relationship for executing migration.

11. A regional management entity, comprising:

a computer processor configured to:

locate a source physical node in a regional physical network;

obtain information of a virtual element corresponding to each virtual network on the source physical node and state information of each physical node in the regional physical network, wherein the state information comprises values for multiple capabilities of each physical node in the regional physical network;

determine, according to information of the virtual element and the state information, a physical node that can execute virtual network migration in the regional physical network, wherein a threshold is set for each of the multiple capabilities in the state information, and wherein the physical node that can execute the network migration in the regional physical network has values for each of the multiple capabilities that are below the thresholds;

reconstruct a mapping relationship between each virtual network and the regional physical network on the physical node that can execute virtual network migration;

compare the mapping relationships of each virtual network;

select a mapping relationship with minimum migration consumption as a mapping relationship for executing migration; and send, according to the mapping relationship for executing migration, a migration instruction to a physical node that needs to execute virtual network migration.

12. The regional management entity according to claim 11, wherein the processor is configured to:
receive a virtual subnet request sent by a central management entity; and
determine, according to state information of the regional physical network, whether a current regional physical network can satisfy a mapping requirement of the virtual subnet request and trigger the locating unit when it is determined that the current regional physical network cannot satisfy the mapping requirement of the virtual subnet request.

13. The regional management entity according to claim 12, wherein the processor is configured to:
select a failed element of a longest matching sequence in the virtual subnet request; and
search for a successfully matched virtual element before the failed element in the matching sequence and use a physical node to which the successfully matched virtual element mapped as the source physical node.

14. The regional management entity according to claim 11, wherein the processor is configured to:
send a query message to a central management entity, wherein the query message is used to query information of a virtual element corresponding to the source physical node; and
receive information of the virtual element corresponding to the source physical node that is returned by the central management entity.

15. The regional management entity according to claim 11, wherein the processor is configured to receive a migration indication message sent by a central management entity and initiate a trigger according to the migration indication message.

16. The regional management entity according to claim 15, wherein the processor is configured to extract an identification of the source physical node from the migration indication message and perform location according to the identification of the source physical node.

17. The regional management entity according to claim 16, wherein the processor is configured to:
detect the state of each physical node in the regional physical network at an interval of a preset duration and initiate a trigger when it is detected that the state of any physical node reaches the preset threshold; and
send a migration request to the central management entity, wherein the migration request is used to feed back state information corresponding to the physical node to the central management entity such that the central management entity sends the migration indication message.

18. The regional management entity according to claim 11, wherein the processor is configured to:

obtain a current mapping relationship corresponding to the virtual network;
calculate migration consumption according to the current mapping relationship and reconstructed mapping relationship; and
compare migration consumption of each virtual network; and
select a mapping relationship with minimum migration consumption from the mapping relationships of the virtual networks as a mapping relationship for executing migration.

19. The regional management entity according to claim 11, wherein the processor is configured to send a feedback message to the central management entity, wherein the feedback message carries the mapping relationship for executing migration such that the central management entity updates a state of a mapping between the regional physical network and the virtual network according to the mapping relationship for executing migration.

20. A system for virtual network migration, comprising:
a regional management entity; and
a central management entity,
wherein the central management entity is configured to provide information of a virtual element corresponding to a source physical node for the regional management entity, and
wherein the regional management entity is configured to:
locate a source physical node in a regional physical network, wherein the source physical node is a physical node that triggers virtual network migration;
obtain information of a virtual element corresponding to each virtual network on the source physical node and state information of each physical node in the regional physical network, wherein the state information comprises values for multiple capabilities of each physical node in the regional physical network;
determine, according to information of the virtual element corresponding to each virtual network on the source physical node and the state information, a physical node that can execute virtual network migration in the regional physical network, wherein a threshold is set for each of the multiple capabilities in the state information, and wherein the physical node that can execute the virtual network migration in the regional physical network has values for each of the multiple capabilities that are below the thresholds;
reconstruct a mapping relationship between each virtual network and the regional physical network on the physical node that can execute virtual network migration;
compare the mapping relationships of each virtual network;
select a mapping relationship with minimum migration consumption as a mapping relationship for executing migration; and
send, according to the mapping relationship for executing migration, a migration instruction to a physical node that needs to execute virtual network migration.

21. The system according to claim 20, wherein providing, by the central management entity, information of the virtual element corresponding to the source physical node for the regional management entity comprises:
receiving, by the central management entity, a virtual network request sent by a user;
splitting, by the central management entity, the virtual network request into virtual subnet requests;

sending, by the central management entity, each of the virtual subnet requests to a regional management entity corresponding to the virtual subnet request;

receiving, by the central management entity, a query message sent by the regional management entity, wherein the query message is used to query information of a virtual element corresponding to a source physical node requiring migration; and sending, by the central management entity, information of the virtual element to the regional management entity such that the regional management entity reconstructs a mapping relationship between the regional physical network and the virtual network according to information of the virtual element, wherein before the regional management entity locates the source physical node in the regional physical network, the system further comprises:
  receiving, by the regional management entity, the virtual subnet request sent by the central management entity;
  determining, by the regional management entity according to state information of the regional physical network, whether a current regional physical network can satisfy a mapping requirement of the virtual subnet request; and
  triggering the step of locating the source physical node in the regional physical network when it is determined that the current regional physical network cannot satisfy the mapping requirement of the virtual subset request, and wherein obtaining, by the regional management entity, information of the virtual element corresponding to the source physical node provided by the central management entity comprises:
  sending, by the regional management entity, a query message to the central management entity, wherein the query message is used to query information of a virtual element corresponding to each virtual network on the source physical node; and
  receiving, by the regional management entity, information of the virtual element corresponding to each virtual network on the source physical node that is returned by the central management entity.

22. The system according to claim 21, wherein after selecting the mapping relationship with minimum migration consumption as the mapping relationship for executing migration, the system comprises:
  sending, by the regional management entity, a feedback message to the central management entity, wherein the feedback message carries the mapping relationship for executing migration such that the central management entity updates a state of a mapping between the regional physical network and the virtual network according to the mapping relationship for executing migration, and wherein after the central management entity sends information of the virtual element to the regional management entity, the system comprises:
  receiving, by the central management entity, the feedback message sent by the regional management entity; and
  updating, by the central management entity, the state of the mapping between the regional physical network and the virtual network according to the mapping relationship for executing migration which is carried in the feedback message.

23. The system according to claim 20, wherein providing, by the central management entity, information of the virtual element corresponding to the source physical node for the regional management entity further comprises:
  sending, by the central management entity, a migration indication message to the regional management entity such that the regional management entity performs virtual network migration according to the migration indication message, wherein the migration indication message carries an identification of the source physical node in the regional management entity, and wherein before the regional management entity locates the source physical node in the regional physical network, the system further comprises:
  receiving, by the regional management entity, the migration indication message sent by the central management entity; and
  triggering, according to the migration indication message, the step of locating the source physical node in the regional physical network.

24. The system according to claim 23, wherein before the regional management entity receives the migration indication message sent by the central management entity, the system further comprises:
  detecting, by the regional management entity, the state of each physical node in the regional physical network at an interval of a preset duration;
  sending a migration request to the central management entity when it is detected that the state of any physical node reaches a preset threshold, wherein the migration request is used to feed back the state information to the central management entity such that the central management entity sends the migration indication message, and
  wherein before the central management entity sends the migration indication message to the regional management entity, the system further comprises receiving, by the central management entity, the migration request sent by the regional management entity.

* * * * *